(12) United States Patent
Lele

(10) Patent No.: US 7,181,574 B1
(45) Date of Patent: Feb. 20, 2007

(54) SERVER CLUSTER USING INFORMED PREFETCHING

(75) Inventor: Abhijeet A. Lele, Pune (IN)

(73) Assignee: Veritas Operating Corporation, Mountain View, CA (US)

( * ) Notice: Subject to any disclaimer, the term of this patent is extended or adjusted under 35 U.S.C. 154(b) by 820 days.

(21) Appl. No.: 10/354,314

(22) Filed: Jan. 30, 2003

(51) Int. Cl.
*G06F 12/02* (2006.01)

(52) U.S. Cl. .................. 711/137; 711/213; 712/207; 714/49

(58) Field of Classification Search ............... None
See application file for complete search history.

(56) References Cited

U.S. PATENT DOCUMENTS 6,145,095 A * 11/2000 Tattari ..................... 714/16
6,148,414 A * 11/2000 Brown et al. ............... 714/9
2001/0044832 A1* 11/2001 Cohn et al. ................ 709/217
2004/0153709 A1* 8/2004 Burton-Krahn ............. 714/4

* cited by examiner

*Primary Examiner*—Hyung Sough
*Assistant Examiner*—Jasmine Song
(74) *Attorney, Agent, or Firm*—Moser IP Law Group

(57) ABSTRACT

A method and apparatus that provides informed prefetching and enhanced memory utilization in a server cluster to improve failover and startup time of a resource group executed by a server cluster. When starting up or failing over a resource group on a given server, the method identifies information for prefetching, informs a file system executed by the server cluster of the identified information, accesses the identified information using the file system, and stores the identified information in main memory for use by the server in the server cluster in advance of when the server actually will need the identified information to failover or initiate resources. To enhance memory utilization the method also identifies pages in cache memory that are not needed for current services provided by a server. Generally these pages contain prefetched information that was already used at start up or failover of a resource group. The identified pages are placed on top of a free page list such that those pages will be reused prior to any other pages in the list being reused.

17 Claims, 4 Drawing Sheets

SERVER CLUSTER USING INFORMED PREFETCHING

BACKGROUND OF THE INVENTION

1. Field of the Invention

The present invention generally relates to data storage systems and, more particularly, a method and apparatus for performing informed prefetching within a server cluster.

2. Description of the Related Art

Modern computer networks generally comprise a plurality of user computers connected to one another and to a computer server via a communications network. To provide redundancy and high availability of information and applications that are executed upon a computer server, multiple computer servers may be arranged in a cluster, i.e., forming a server cluster. Such server clusters are available under the trademark VERITAS CLUSTER SERVER from Veritas Software Corporation of Mountain View, Calif. In such server clusters, a plurality of servers communicate with one another to facilitate failover redundancy such that when software or hardware (i.e., computer resources) become inoperative on one server, another server can quickly execute the same software that was running on the inoperative server substantially without interruption. As such, a user of server services that are supported on a server cluster would not be substantially impacted by the inoperative server or software.

To ensure that the user is not substantially impacted by a failover process, techniques are needed to make the failover process occur as rapidly as possible. Therefore, there is a need in the art for a method and apparatus that provides rapid failover of resources from one server to another server within a server cluster.

SUMMARY OF THE INVENTION

The present invention is a method and apparatus that provides informed prefetching and enhanced memory utilization in a server cluster to improve failover and startup time of a resource group executed by a server cluster. When starting up or failing over a resource group on a given server, the inventive method identifies information for prefetching, informs a file system executed by the server cluster of the identified information, accesses the identified information using the file system, and stores the identified information in main memory for use by the server in the server cluster in advance of when the server actually will need the identified information to failover or initiate resources. To enhance memory utilization the method also identifies pages in cache memory that are not needed for current services provided by a server. Generally these pages contain prefetched information that was already used at start up or failover of a resource group. The identified pages are placed on top of a free page list such that those pages will be reused prior to any other pages in the list being reused.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The present invention is a method for prefetching information for enhancing resource group failover and startup performance of a server cluster. Additionally, the invention includes a method of improved cache memory utilization in a server cluster.

Figure 1:
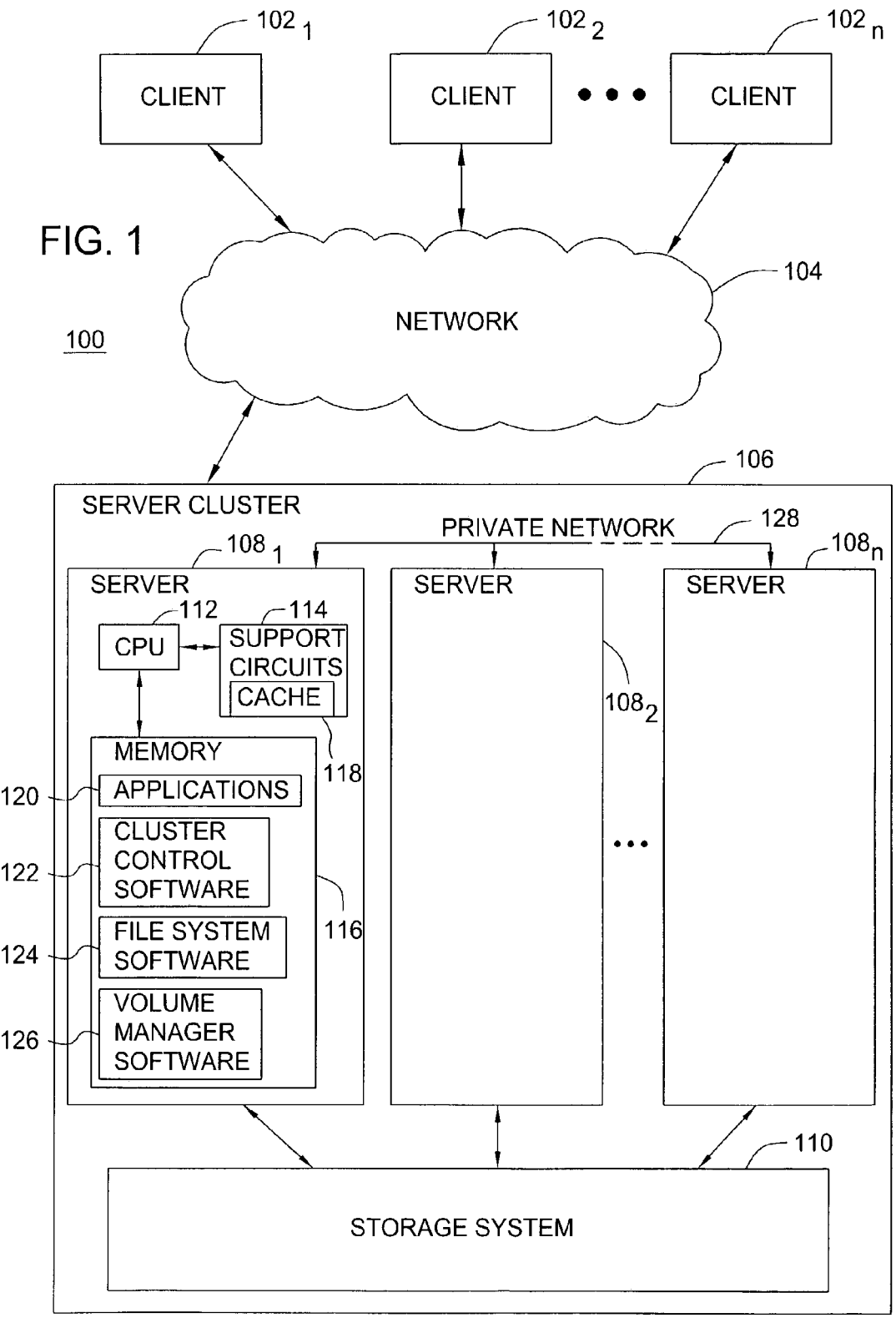
FIG. 1 depicts a block diagram of a computer network comprising a server cluster that utilizes one embodiment of the present invention.

FIG. 1 depicts a computer network 100 in which one embodiment of the present invention may be utilized. The computer network 100 comprises a plurality of client computers $102_1$, $102_2$, ... $102_n$ that are connected to a server cluster 106 via a computer network 104. The client computers $102_1$, $102_2$, ... $102_n$ may contain one or more individual computers, wireless devices, personal digital assistants, desktop computers, laptop computers or any other digital device that may benefit from connection to a computer network.

The network 104 is a conventional computer network such as Ethernet. Although one server cluster 106 is depicted in FIG. 1, those skilled in the art will realize that many server clusters benefiting from the invention can be connected to the network 104.

The server cluster 106 consists of multiple servers $108_1$, $108_2$, ... $108_n$ that are connected in various combinations to shared storage devices depicted as storage system 110. Each server $108_1$, $108_2$, ... $108_n$ are referred to as nodes of the server cluster 106. Such a server cluster 106 is available as a VERITAS CLUSTER SERVER from Veritas Software Corporation of Mountain View, Calif. Each server comprises at least one central processing unit (CPU) 112, support circuits 114, and memory 116. The CPU 112 may comprise one or more conventionally available microprocessors. The support circuits 114 are well known circuits that comprise cache, power supplies, clocks, input/output interface circuitry and the like. As shall be described below, the support circuit 114 that is particularly important to the invention is cache memory 118.

The memory 116 may comprise random access memory, read only memory, removable disk memory, flash memory, and various combinations of these types of memory. The memory 116 is sometimes referred to as main memory and may in part be used as cache memory 118. The memory 116 stores such software as applications 120, cluster control software 122, file system software 124 and volume manager software 126. The applications 120 include, as discussed below, certain software resources and agents (see FIG. 2) that are used by the present invention. A private network 128 interconnects each of the servers $108_1$, $108_2$ ... $108_n$ that are members of the server cluster 106.

In a server cluster 106, various applications 120 (referred to herein as a form of resource) are executed on each server $108_1$, $108_2$, ... $108_n$. If during operation, one of the applications fails, hardware supporting the application fails, or an entire server fails, another server within the server cluster 106 will execute the application from the point at which the failure occurred. As such, a client $102_1$, $102_2$, ... $102_n$ will not experience any interruption or will experience minimal interruption of the services provided by the server cluster 106. To facilitate this high availability of computer services the server cluster control software 122 monitors and controls applications running in the cluster 106 and can restart applications 120 in response to a variety of hardware or software faults.

The server cluster 106 is generally defined as all servers with the same cluster identification and connected to one another via a set of redundant heartbeat networks, e.g., one or more public or private networks 128. All nodes 108 in the cluster 106 are constantly aware of the status of all resources on all other nodes 108. Applications 120 can be configured to run on specific nodes 108 in the cluster 106. The storage system 110 is configured to provide access to shared application data for those servers 108 hosting the application. In that respect, the actual storage system connectivity will determine where applications can be executed. The nodes 108 sharing access to storage within the storage system 110 will be eligible to execute a common application and are able to failover such applications. Nodes 108 without common storage cannot failover an application that stores data to disk.

Although the server cluster is described as having servers share a common storage system, the invention is applicable to so-called "shared nothing" clusters, where the servers operate independently within a cluster.

Within the server cluster 106, resources are defined as hardware or software entities such as disks, network interface cards, IP addresses, applications and databases that are controlled by the cluster control software 122. Controlling a resource means bringing the resource online (onlining or starting), taking the resource offline (stopping) as well as monitoring the health and status of the resource. Resources are classified according to types and multiple resources can be a single type. For example, two disk resources are both classified as type "disk". How the cluster control software 122 starts and stops a resource is specific to the resource type. For example, mounting starts a file system resource and an IP resource is started by configuring an IP address on a network interface card. Monitoring a resource means testing the resource to determine if the resource is online or offline. How the cluster control software 122 monitors a resource is specific to the resource type. For example, a file system resource tests as "online" if mounted, and an IP address tests as "online" if configured. Each resource is identified by a name that is unique among all resources in the cluster. The cluster control software 122 includes a set of predefined resource types. For each resource type the cluster control software 122 has a corresponding agent. The agent provides the resource type specific logic to control resources.

The actions required to bring a resource online or take it offline differ significantly for different types of resources. Bringing a disk group online, for example, requires importing the disk. Bringing a database online requires starting a database manager process and issuing the appropriate startup command or commands to a database manager. From the cluster control software 122 point of view, the same result is achieved, i.e., making the resource available. However, the actions performed to achieve the result are quite different. The cluster control software 122 handles this function disparity between different types of resources using agents that correspond to each resource.

As mentioned above, each type of resource supported in a cluster is associated with an agent. An agent is an installed program designed to control a particular resource type. For example, for the cluster control software 122 to bring a database resource online, it does not need to understand the database language; it simply passes the "online" command to the database agent. The database agent knows to call a server manager and issue the appropriate startup command. Because the structure of the cluster resource agents is straight forward, it is relatively easy to develop agents as additional cluster resource types are identified.

A service group (also known as resource group) is a set of resources working together to provide application services to clients. For example, a Web application service group might consist of:

Disk groups on which the web pages to be served are stored

A volume built in the disk group

A file system using the volume

A database whose table spaces are files and whose rows contain page pointers

The network interface card or cards used to export the web service

One or more IP addresses associated with the network card or cards

The application program and associated code libraries

The cluster control software 122 performs administrative operations on resources, including starting, stopping, restarting and monitoring at the service program level. Service group operations initiate administrative operations for all resources within the group. For example, when a service group is brought online, all resources within the group are brought online. When a failover occurs in the server cluster 106, resources never failover individually, the entire service group that the resource group is a member of is the unit of a failover. If there is more than one group defined on a server 108, one group may failover without effecting the other group or groups executing on the server 108. From a cluster standpoint, there are two significant aspects to this view of an application service group as a collection of resources. First, if the service group is to run on a particular server, all the resources the group requires must be available to the server. Second, the resources comprising a service group have interdependencies; that is, some resources (e.g., volumes) must be operating before other resources (e.g., the file system), can be made operational.

One of the most important parts of a service group definition is the concept of resource dependencies. As mentioned above, resource dependencies determine the order that specific resources within a service group are brought online or offline when the service group is brought offline or online. For example, a disk group, as defined by the volume manager software 126, must be imported before volumes in the disk groups can be started, and volumes must be started before file systems can be mounted. In the same manner, file systems must be unmounted before volumes are stopped, and volumes stopped before the disk groups are deported.

The server cluster 106 uses a public network, private network or both (shown as network 128) to facilitate communication between cluster nodes for cluster maintenance. This communication takes the form of nodes 108 informing other nodes 108 they are alive, known as a heartbeat. Nodes 108 inform other nodes 108 of actions taking place within the nodes and the status of all resources on a particular node. The cluster communication between nodes is facilitated using a private dedicated network, a public shared network, or both. Two independent networks between all clustered nodes may be used to provide both path redundancy and to discriminate between a network failure and a server failure.

Figure 2:
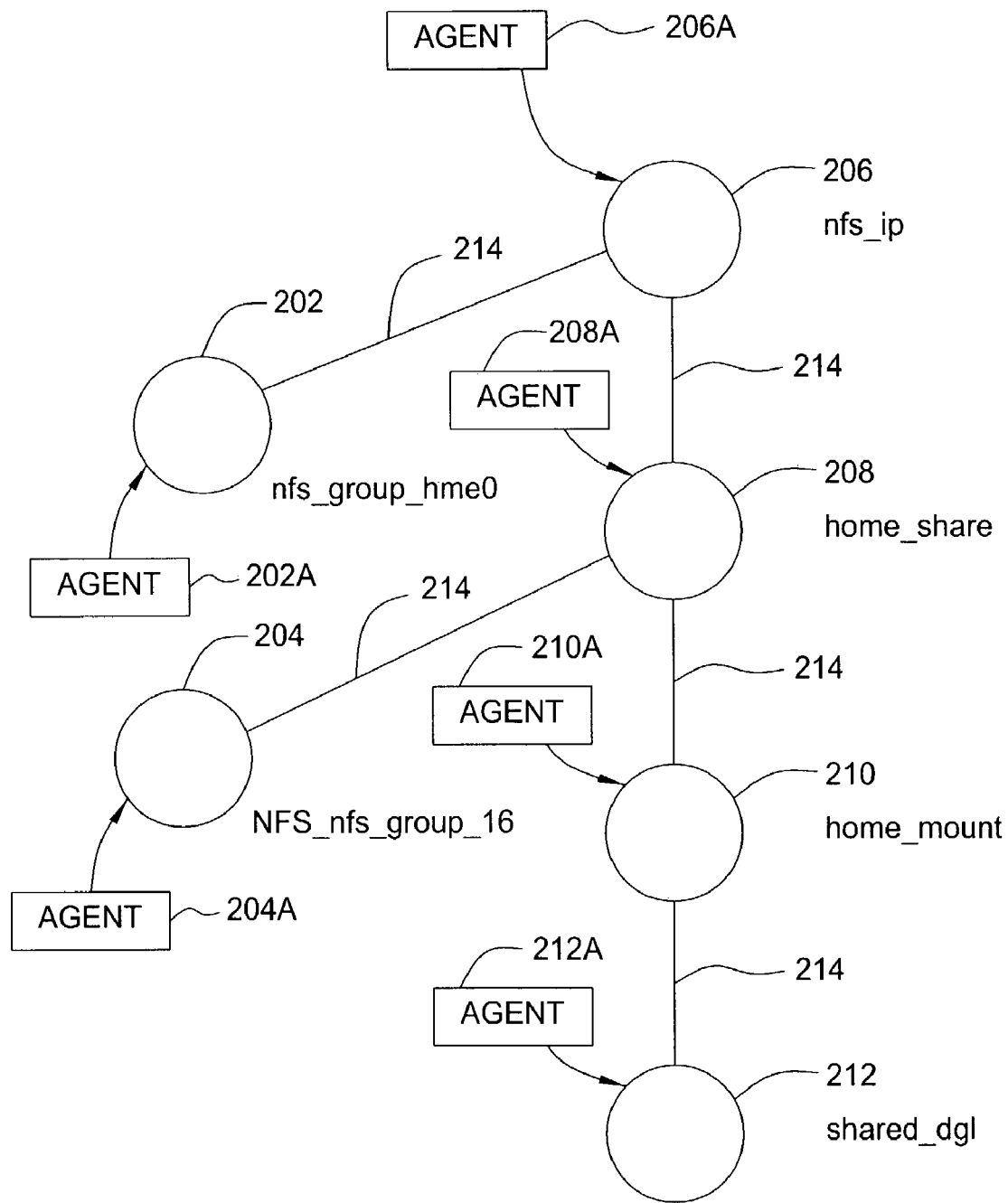
FIG. 2 depicts a block diagram of an illustrative resource group.

FIG. 2 depicts a resource group that is executed on a two node cluster serving a single network file system to a plurality of clients. As such, the cluster itself consists of two nodes (e.g., a first server and a second server); connected to shared storage to allow both servers to access the data needed for file system export. In the resource group depicted in FIG. 2, the cluster control software needs to configure a single service group 200 called NFS_Group that will be failover between the first server and the second server, as necessary. The service group 200 configured as a failover group consists of resources 202, 204, 206, 208, 210, and 212, each resource having a different resource type. The resources 202 through 212 must be started in a specific order for the group to function. This startup order is defined by resource dependencies 214. Finally, to control each specific resource type, the cluster control software will require an agent 202A, 204A, 206A, 208A, 210A and 212A.

To begin the startup process (or a failover process), the cluster control software will read a configuration file for the group 200 and determine what agents are necessary to control the resources in the group 200, as well as resources in any other service group configured to run on the server. It also starts the corresponding agents 202A, 204A, 206A, 208A, 210A, and 212A for each resource 202, 204, 206, 208, 210, and 212. The cluster control software determines the order to bring up the resources based on the resource dependencies statements in the configuration file. When it is time to put the service group 200 online, the cluster control software issues online commands to the proper agent 202A through 212A in the proper order. The drawing in FIG. 2 is a representation of a service group 200, with the appropriate resources 202 through 212, agents 202A through 212A and dependencies 214 for the NFS Group.

In this configuration, the cluster control software starts agents 202A through 212A for the disk group (shared_dg1), mount (home_mount), share (home_share), network file system (NFS_nfs_group_16), network interface card (NFS_group_hme∅) and IP on all servers configured to execute this group. The resource dependencies are configured as follows:

The /home file system, shown as home_mount (resource 210), requires the disk group shared_dg1 (resource 212) to be online before mounting.

The network file system export of the home file system (resource 208) requires the home file system to be mounted as well as the network file system daemons, NFS_nfs_group_16 (resource 204) to be running.

The high availability IP address, nfs_ip (resource 206), requires the file system to be shared as well as the network interface to be up, represented as nfs_group_hme∅ (resource 202).

The network file system daemons (resources 202 and 204) and the disk group (resource 212) have no lower (child) dependencies, so they can start in parallel.

The network interface card resource (not shown) is a persistent resource that does not require starting.

The NFS_Group can be configured to start automatically on either node in the example. The group can then move or failover to the second node based on operator command, or automatically if the first node fails. The server cluster control software puts resources offline starting at the top (resource 206) of the group 200 and starts them on the second node starting at the bottom (resource 212) of the group 200.

Each of the resources identified above in the NFS_Group service group 200 require certain configuration files, control files and data files to execute properly on a server. These configuration files, control files and data files must be made available when a particular resource is to be executed. To improve the speed at which the resource group can be brought online or failed over, the invention prefetches certain information to enable the resources to be executed rapidly when needed. Furthermore, server "CPU cycles" that would otherwise be wasted while awaiting resource onlining are used to prefetch information. As such, a server that uses the present invention is utilized more efficiently.

Figure 3:
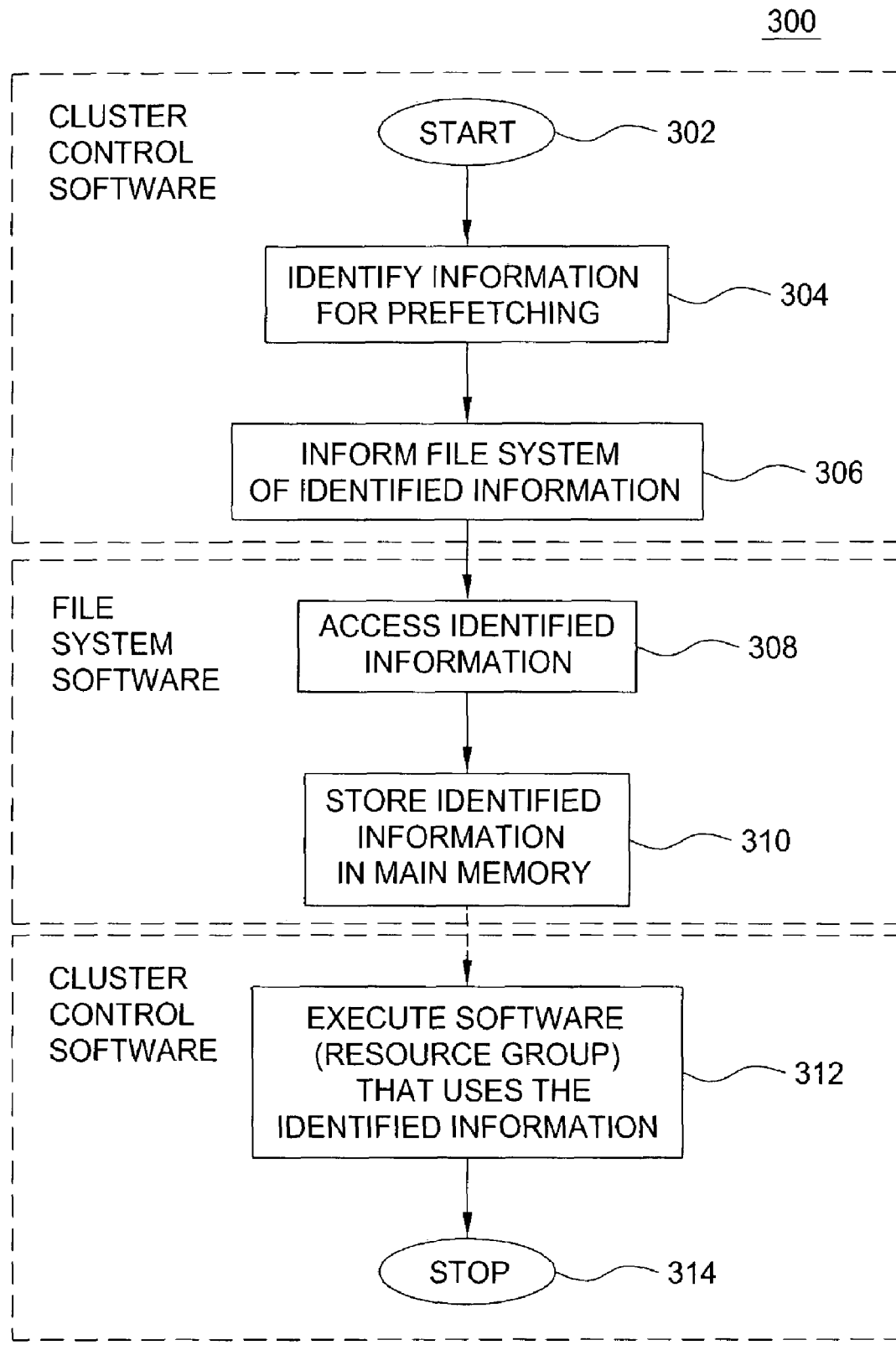
FIG. 3 depicts a flow diagram of a method for prefetching data in a server cluster.

FIG. 3 depicts a flow diagram of a method 300 of prefetching information for a resource group in accordance with the present invention. The method starts at step 302 where the cluster control software identifies a resource group that must be onlined or failed over on a particular server. The particular server that is identified to start the resource group is instructed at step 302 by the cluster control software to begin method 300. The method proceeds from step 302 to step 304 wherein the method identifies information for prefetching. This information is identified in the configuration file for the resource group. The configuration file for the resource group identifies all the resources and agents necessary for the resource group. The method 300 then uses the list of resources to identify particular information that is necessary to start each of the resources within the resource group. This information may include, but is not limited to, particular configuration files, executable files, control files, data files, shared libraries, activity log files, recovery files and the like.

At step 306, the method 300 informs the file system software of the identified information. At step 308, the file system will access the identified information and at step 310 the identified information will be stored in main memory or cache memory. In this manner, the identified information necessary to execute all of the resources within a resource group has been prefetched on an informed basis and is ready for any resource in the resource group to be executed. The prefetching method 300 may be performed as a single task or it may be subdivided over the entire duration required for service group onlining or over a duration used for onlining a particular resource within a service group. In some instances, the prefetched information must be accessed intermittently because the information required is not known until a particular child resource is brought online. For example, certain binary files may not be available for prefetching until an associated disk group is imported and the file system is mounted. Thus, prefetching of the binary files does not occur until completion of importing of the disk group and mounting of the file system. Furthermore, some prefetched information may contain large files that can be prefetched as partial files. As such, partial files will be accessed and stored until either enough information is available for the onlining process or until the complete file is stored in main memory. Any amount of information that can be prefetched will speed up the onlining or failover procedure. Thus, the amount of information that is prefetched may range from an individual block of data to very large files that are accessed as partial or full files. The server cluster control software decides, after consultation with the resource configuration file, whether to prefetch a full or partial file. The decision is based upon, for example, the size of the file and the amount of time that is required to retrieve the file. The process for prefetching information should not impact the regular server operations. As such, partial file retrieval may be used to retrieve information in small amounts within a time period that is defined by the time required to on-line a resource, i.e., during a time when the server would otherwise be waiting and wasting CPU cycles.

At step 312, at some time later, the software within the resource group is executed using the resource agents and those resources within the resource group will use the identified information that is presently stored in main memory. At step 314, the method 300 stops. In this manner, as the resource group is brought online or failed over, the cluster control software does not have to wait for requests to the file system to retrieve the identified information. As such, all necessary information is available to the resource group and the resource group can be rapidly brought online or failed over. The method 300, in essence, anticipates what information is going to be required by the resource group and uses an informed prefetching process to retrieve that information for use by the resource group as it is brought online or failed over.

Once the identified information that is stored in main memory is used by the resource group to online or failover the resource group, much of that information is not reused. In a typical operation of file page cache memory within a server, the memory pages that are not to be reused are identified by the server cluster control software as free pages and are placed by the file system on the bottom of a free page list. Under control of the file system software, the pages on the top of the list are reused first and the pages on the bottom of the list are reused at a later time. As such, the pages in the free page list are aged in order of being deemed free. Consequently, if the server requires to use a page that was previously freed but now has been identified as necessary, that page may still remain in the list and can be recalled by the file system and reallocated for use by the server. However, since the cluster control software knows for a fact that that pages that were used in resource group onlining or failover will certainly not be used again, those pages can be freed by the cluster control software and reused right away by the file system software. As such, the invention improves memory utilization by placing those particular freed pages on the top of the list as soon as the cluster control software deems them free.

Figure 4:
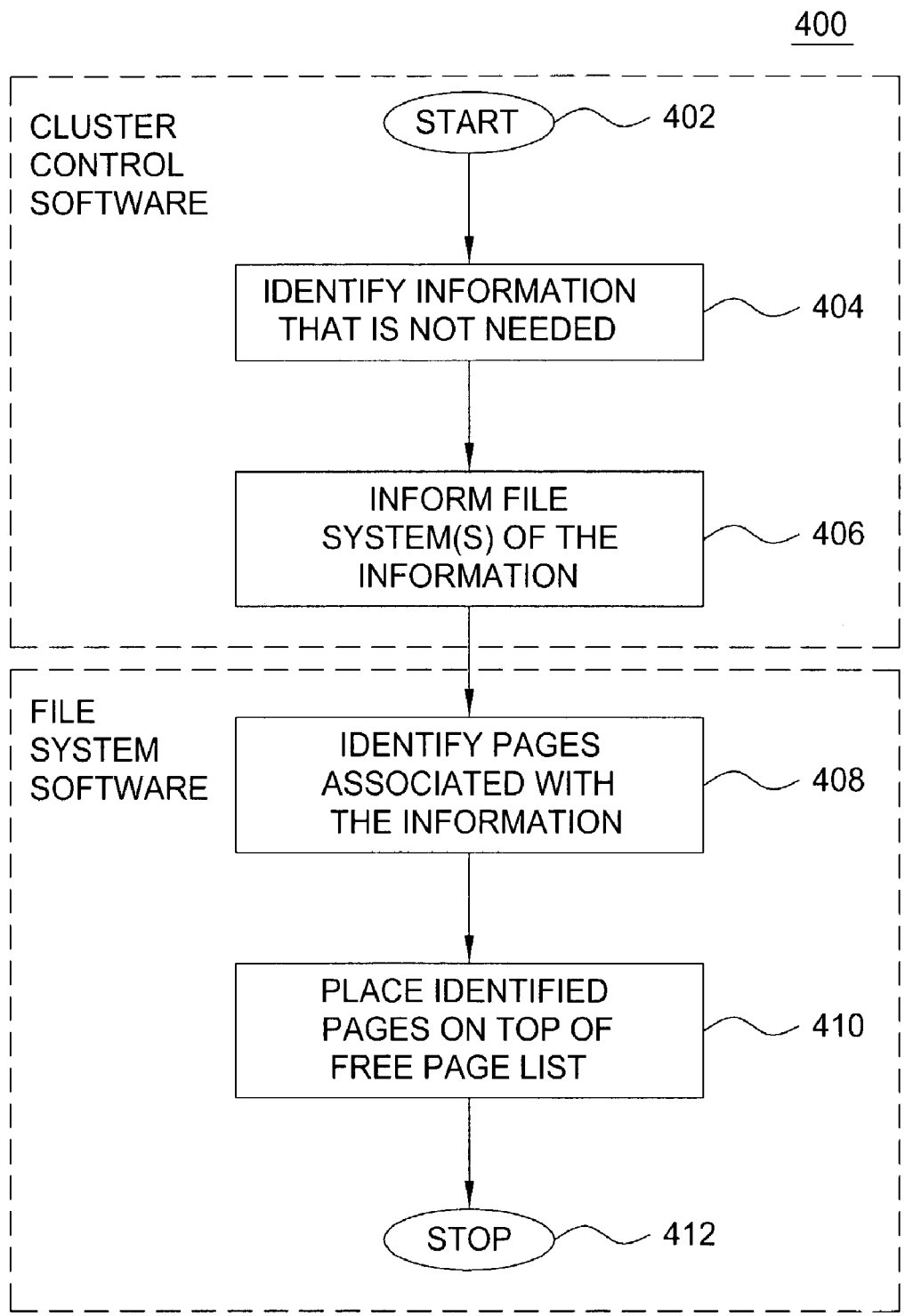
FIG. 4 depicts a flow diagram of a method for enhancing cache memory utilization in a server cluster.

FIG. 4 depicts a method 400 for utilizing memory in the manner described above. The method starts at step 402 and proceeds to step 404 wherein the cluster control software identifies information that is no longer needed (e.g., files containing information used in onlining resources as well as other information that is no longer needed). At step 406, the identity of this information is sent to the file system software. More than one file system may need to be informed of the information. At step 406, the file system software identifies the pages that are associated with the information and deems them free pages and, at step 410, the file system software places the identified pages on top of the free page list. At step 412, the method 400 stops. In this manner, the pages of memory that were used to online or failover the resource group are rapidly reused by the server.

While foregoing is directed to an illustrative embodiment of the present invention, other and further embodiments of the invention may be devised without departing from the basic scope thereof, and the scope thereof is determined by the claims that follow.

The invention claimed is:

1. A method of prefetching information for a server within a server cluster comprising:
    identifying information for prefetching that will be needed in the future for executing resources in a resource group in an order defined by resource dependencies;
    retrieving the identified information from storage;
    storing the identified information in main memory; and
    executing at least one resource in the resource group, in the order defined by the resource dependencies, using the identified information during start up or failover of the at least one resource.

2. The method of claim 1 wherein the information for prefetching is identified using a resource group configuration file.

3. The method of claim 1 wherein the executing step further comprises executing an agent to facilitate execution of the at least one resource.

4. The method of claim 3 wherein the at least one resource comprises a plurality of different resources in the resource group and a different agent is used to facilitate execution of each different resource.

5. The method of claim 1 further comprising:
    identifying memory pages in main memory that contain identified information that will no longer be used by the server;
    freeing the identified memory pages for reuse;
    placing the identified memory pages in a free memory stack; and
    reusing the identified memory pages prior to using other memory pages in the free memory stack.

6. Apparatus for prefetching information for a server within a server cluster comprising:
    means for identifying information for prefetching that will be needed in the future for executing resources in a resource group in an order defined by resource dependencies;
    means for retrieving the identified information from storage;
    means for storing the identified information in main memory; and
    means for executing at least one resource in the resource group, in the order defined by the resource dependencies, using the identified information during start up or failover of the at least one resource.

7. The apparatus of claim 6 wherein the information for prefetching is identified using a resource group configuration file.

8. The apparatus of claim 6 wherein the executing means further comprises means for executing an agent to facilitate execution of the at least one resource.

9. The apparatus of claim 8 wherein the at least one resource comprises a plurality of different resources in the resource group and a different agent is used to facilitate execution of each different resource.

10. The apparatus of claim 9 further comprising:
    means for identifying memory pages in main memory that contain identified information that will no longer be used by the server;
    means for freeing the identified memory pages for reuse;
    means for placing the identified memory pages in a free memory stack; and
    means for reusing the identified memory pages prior to using other memory pages in the free memory stack.

11. Apparatus for prefetching information for a server within a server cluster comprising:
- cluster control software that identifies information for prefetching that will be needed in the future for executing resources in a resource group in an order defined by resource dependencies;
- file system software for retrieving the identified information from storage;
- a main memory for storing the identified information; and
- a microprocessor for executing at least one resource in the resource group, in the order defined by the resource dependencies, using the identified information during start up or failover of the at least one resource.

12. The apparatus of claim 11 wherein the information for prefetching is identified using a resource group configuration file.

13. The apparatus of claim 11 wherein the microprocessor executes an agent to facilitate execution of the at least one resource.

14. The apparatus of claim 13 wherein the at least one resource comprises a plurality of different resources in the resource group and a different agent is used to facilitate execution of each different resource.

15. The apparatus of claim 11 wherein the cluster control software identifies memory pages in the main memory that contain identified information that will no longer be used by the server; the files system software indicates that the identified memory pages are reusable and places the identified memory pages in a free memory stack; and the microprocessor reuses the identified memory pages prior to using other memory pages in the free memory stack.

16. A server cluster comprising:
- a plurality of servers that are interconnected by a private network, each of the servers containing a main memory and capable of executing at least one resource group;
- a storage system, coupled to each of the plurality of servers, for storing information used in starting or failing over the at least one resource group; and
- each of the servers executing cluster control software that, when a particular server requires a particular resource group to start up or failover, identifies information for prefetching that will be needed in the future for executing resources in the particular resource group in an order defined by resource dependencies and file system software for retrieving the identified information from the storage system and storing the identified information in main memory of the particular server;
- a microprocessor, within the particular server, for executing at least one resource in the particular resource group, in the order defined by the dependencies, using the identified information during start up or failover of the particular resource group.

17. The server cluster of claim 16 wherein the cluster control software identifies memory pages in the main memory of the particular server that contain identified information that will no longer be used by the particular server; the files system software indicates that the identified memory pages are reusable and places the identified memory pages in a free memory stack; and the microprocessor reuses the identified memory pages prior to using other memory pages in the free memory stack.

* * * * *